Mar. 13, 1923. 1,448,623.
O. H. GARDALEN.
CLUTCH RELEASE FOR TRACTORS.
FILED OCT. 4, 1921.
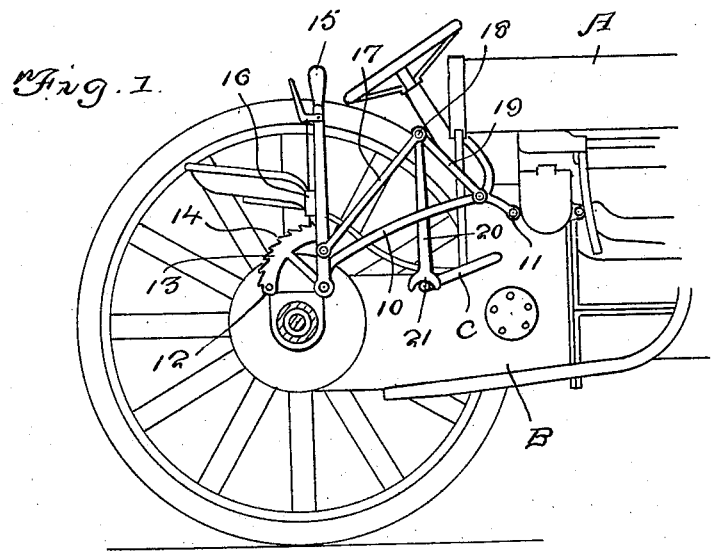
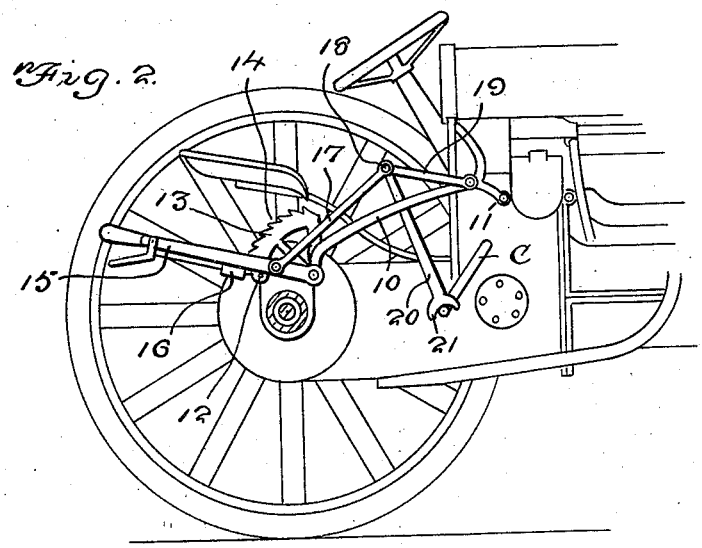
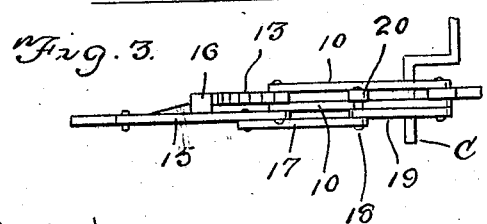
O. H. Gardalen
INVENTOR
BY Victor J. Evans
ATTORNEY
WITNESS:

Patented Mar. 13, 1923.

1,448,623

UNITED STATES PATENT OFFICE.

OLIVER H. GARDALEN, OF DOWS, IOWA.

CLUTCH RELEASE FOR TRACTORS.

Application filed October 4, 1921. Serial No. 505,397.

*To all whom it may concern:*

Be it known that I, OLIVER H. GARDALEN, a citizen of the United States, residing at Dows, in the county of Wright and State of Iowa, have invented new and useful Improvements in Clutch Releases for Tractors, of which the following is a specification.

This invention relates to clutch control device and has for it object the provision of novel means for controlling the position of the transmission clutch pedal of a Fordson or other similar tractor which is provided with a pulley driven from the engine transmission, this pulley being designed for transmitting power to some mechanism to be driven.

When a belt is in place upon the drive pulley of the tractor, it is almost impossible to crank the engine, unless the clutch lever or pedal is moved to released or thrown out position, and in view of the fact that the clutch lever is normally urged into operative position, considerable inconvenience is ordinarily encountered by the necessity of temporarily tying down the clutch pedal, or else requiring two persons to engage in cranking the engine, one person holding the clutch down while the other rotates the crank; it has heretofore been exceedingly inconvenient to stop the drive action from the tractor pulley momentarily for the purpose of adjustment or the like without stopping the operation of the engine.

It is with the above mentioned objections to the present mechanism in view that my invention has been designed and my device includes means for holding the clutch pedal of a Fordson tractor in released or neutral position, my device being formed entirely as an attachment which may be manufactured and sold as a separate entity to be applied to already existing tractors.

Another object is the provision of a clutch release means of this character which is not secured to the clutch pedal but which is merely in engagement with the clutch pedal when its use is desired so that the clutch may be operated in the usual manner without interference.

An additional object is the provision of a device of this character which will be simple and inexpensive in manufacture, highly efficient in use, easy to install, durable in service and a general improvement in the art.

With the above and other objects in view, the invention consists in the details of construction to be hereinafter more fully described and claimed, and illustrated in the accompanying drawings in which:

Figure 1 is a side elevation of a portion of a Fordson tractor, showing my devices associated therewith, and The remaining figures are detailed views of my clutch release device.

Referring more particularly to the drawings the letter A designates a portion of tractor of the Fordson type, B designates the transmission case thereof, and C designates the lever or foot pedal which is designed for throwing the clutch into operative or inoperative position.

In carrying out my invention I provide a pair of guides 10, in the nature of suitably curved arms or rods, which are secured upon the tractor at any desired location thereon as indicated at 11. These guides 10 are arranged in spaced parallel relation as clearly shown. Also suitably secured upon the tractor mechanism as indicated at 12, is a segment 13 formed with teeth 14 facing toward the rear of the tractor. Pivoted with respect to the segment 13 is a lever 15 which is provided with a grip release locking pawl 16 adapted to cooperate with the teeth 14 on the segment 13 whereby to hold the lever 15 in any desired adjusted position. Pivotally connected with the lever 15 is a link 17 which is in turn pivotally connected, as shown at 18, with a second link 19 which is pivoted to the forward end of one of the guides 10. Pivotally connected by means of the pivot point 18 previously described is a bar 20 which has its lower end forked as shown at 21 for engagement with the clutch pedal of the tractor.

Under ordinary conditions the lever 15 is in upright position whereupon the links 17 and 19 will be arranged as shown in Figure 1 with the fork 21 of the bar 20 engaging the clutch pedal C but allowing the clutch pedal to be in its uppermost position, that is with the transmission clutch in gear or in operative position.

In the event that it is desired to hold the clutch in neutral or in operative position, as for instance when cranking the motor of the tractor, it is merely necessary that the operator grasp the lever 15 and pull the same rearwardly and then release the locking pawl 16 so that the latter will engage with the teeth 14 at the rear portion of toothed segment 13. When this is done it will be apparent that there will be a tendency to straighten out the links 17 and 19 which will of course result in forcing the bar 20 downwardly and as this bar 20 has its lower end forked as shown at 21 and engaging the clutch lever C, it will be apparent that this clutch lever or pedal C will be forced downwardly into such position as to disengage the clutch of the transmission of the tractor. The parts will remain in this position, naturally, until the operator releases the locking pawl and returns the lever 15 to its normal or upright position.

From the foregoing description and a study of the drawings it will be apparent that I have thus provided a very simply constructed and easily installed device by means of which the transmission clutch control pedal of a Fordson tractor, or in fact any other tractor, of similar design, may be readily held in neutral or inoperative position for any desired purpose, such as for instance while cranking the engine of the tractor. It will also be noted that the structure is such that when the clutch pedal is moved to its inoperative position it will be automatically held in such position without any attention whatever from the operator until the mechanism is actually and positively released whereby to permit clutch pedal to return to normal or engaged position.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention I claim:

1. In combination with the clutch pedal of a tractor, the clutch pedal being normally in operative position; of a guide device secured upon the tractor, a lever pivotally mounted with respect to the tractor and movable over a notched segment and provided with a grip release locking pawl cooperating with the segment, links within the guide device pivotally connected with said lever and with the tractor, and a bar pivotally connected with said links at the pivotal connection thereof and normally engaging the clutch pedal.

2. In combination with the clutch control pedal of a tractor, a guide device mounted upon the tractor and including spaced elements, a lever pivotally mounted upon the tractor, a notched segment associated with and over which said lever moves, a grip released locking pawl mechanism carried by the lever and engageable with said notched segment whereby to hold the lever in the desired adjusted position, a link pivotally connected with the lever, a link pivotally connected with said link and with the tractor, said links being arranged between the elements of the guide device, and a bar pivotally connected with said pivot point and having a forked end engaging the clutch pedal.

3. In combination with the clutch pedal of a tractor, a pair of spaced curved bars secured upon the tractor and constituting a guide, a notched segment secured upon the tractor, a pivoted lever carrying a grip released locking pawl cooperating with said notched segment, a link pivotally mounted at one end between said guides, a second link pivotally connected with the lever and pivotally connected with the rear end of the said first named link, and a bar pivotally connected with both of said links at the pivotal connection thereon and having a forked end normally engaging the clutch control pedal.

In testimony whereof I affix my signature.

OLIVER H. GARDALEN.